United States Patent
Terelak et al.

(10) Patent No.: US 12,066,078 B2
(45) Date of Patent: Aug. 20, 2024

(54) MECHANICAL SYSTEM WITH DOUBLE-SIDED CHAIN

(71) Applicant: JMJ SYNERGIA SPOLKA Z OGRANICZONA ODPOWIEDZIALNOSCIA, Warsaw (PL)

(72) Inventors: Marek Grzegorz Terelak, Legnica (PL); Jan Roman Mroczka, Legnica (PL)

(73) Assignee: JMJ SYNERGIA SP. Z O.O., Warsaw (PL)

( * ) Notice: Subject to any disclaimer, the term of this patent is extended or adjusted under 35 U.S.C. 154(b) by 0 days.

(21) Appl. No.: 18/023,344

(22) PCT Filed: Aug. 2, 2021

(86) PCT No.: PCT/PL2021/000054
§ 371 (c)(1),
(2) Date: Feb. 25, 2023

(87) PCT Pub. No.: WO2022/045908
PCT Pub. Date: Mar. 3, 2022

(65) Prior Publication Data
US 2023/0313862 A1    Oct. 5, 2023

(30) Foreign Application Priority Data

Aug. 25, 2020   (PL) .......................... 435092

(51) Int. Cl.
*F16G 13/04*    (2006.01)
*F16G 13/18*    (2006.01)
(Continued)

(52) U.S. Cl.
CPC ............. *F16G 13/04* (2013.01); *F16G 13/18* (2013.01); *F16H 7/08* (2013.01); *F16H 55/30* (2013.01); *F16H 2007/087* (2013.01)

(58) Field of Classification Search
CPC . F16G 13/04; F16G 13/18; F16H 7/06; F16H 55/30; F16H 7/08; F16H 2007/087
(Continued)

(56) References Cited

U.S. PATENT DOCUMENTS 687,146 A * 11/1901 Fleckenstein ........... F16H 27/04
                                                                474/84
1,140,319 A * 5/1915 Van Houten .............. F16H 7/06
                                                                305/202
(Continued)

FOREIGN PATENT DOCUMENTS

CN    103629315 A    3/2014
CN    107061650 A    8/2017
(Continued)

*Primary Examiner* — Henry Y Liu
(74) *Attorney, Agent, or Firm* — Andrzej Malarz, Esq.

(57) ABSTRACT

A mechanical system with a double-sided chain, composed of a driving wheel (S1), a tensioner wheel (S2) for the chain (1), a driven wheel (S3) and a chain (1), which winds around the wheels (S1) and (S2), and engages the wheel (S3) on its outer side, characterized in that the wheel centres (S1), (S2) and (S3) are not collinear, whereas the position of wheel axis (S2) in relation to wheel axis (S1) and (S3) determines the line of operation of chain (1) and determines the optimal angle alpha between the direction of the force vector F and the perpendicular to the straight line joining the centres of tensioner wheel (S2) and driven wheel (S3), and passing through point (B) where force F1 is applied. while the value of the angle alpha is equal 15 degrees.

1 Claim, 4 Drawing Sheets

(51) Int. Cl.
  *F16H 7/08* (2006.01)
  *F16H 55/30* (2006.01)
(58) Field of Classification Search
  USPC .......................................... 474/139
  See application file for complete search history.

(56) References Cited

U.S. PATENT DOCUMENTS

| | | | | |
|---|---|---|---|---|
| 1,956,942 A * | 5/1934 | Belcher | ............... | F16H 7/06 474/213 |
| 3,083,582 A * | 4/1963 | Wheeler | ............... | F16H 7/023 474/205 |
| 3,166,947 A * | 1/1965 | Hendershot | ............ | B41F 13/14 474/900 |
| 3,730,011 A * | 5/1973 | Cahill | ............... | F16H 7/023 474/139 |
| 3,822,485 A * | 7/1974 | Bates | ............... | D06C 7/00 474/84 |
| 4,481,005 A * | 11/1984 | Mann, Jr. | ............... | F16H 7/023 474/139 |
| 5,362,279 A * | 11/1994 | Galchefski | ............ | F16H 57/022 474/134 |
| 5,967,926 A * | 10/1999 | Kozakura | ............... | F16G 13/04 474/213 |
| 5,989,140 A * | 11/1999 | Ichikawa | ............... | F16G 13/04 474/212 |
| 6,086,494 A * | 7/2000 | Crosta | ............... | F16H 7/24 474/139 |
| 6,142,902 A * | 11/2000 | Ichikawa | ............... | F16G 13/04 474/212 |
| 6,171,209 B1 * | 1/2001 | Matsuda | ............... | F16G 13/04 474/212 |
| 6,440,022 B1 * | 8/2002 | Ichikawa | ............... | F16G 13/04 474/212 |
| 6,575,861 B2 * | 6/2003 | Markley | ............... | F16H 55/30 474/213 |
| RE38,887 E * | 11/2005 | Bode | ............... | F16H 9/10 474/139 |
| 7,059,985 B2 * | 6/2006 | Markley | ............... | F16G 13/04 474/213 |
| 7,229,375 B2 * | 6/2007 | Hummel | ............... | F16G 13/04 474/213 |
| 7,458,883 B2 * | 12/2008 | Wilson | ............... | B24B 41/047 451/353 |
| 7,641,578 B2 * | 1/2010 | Matsui | ............... | F16G 13/04 474/212 |
| 7,780,559 B2 * | 8/2010 | Zbikowski | ............ | F16G 13/02 474/213 |
| 8,888,632 B2 * | 11/2014 | Yasuta | ............... | F16H 7/06 474/212 |
| 9,631,699 B2 * | 4/2017 | Dietrich | ............... | F16G 13/04 |
| 10,359,097 B2 * | 7/2019 | Hall | ............... | F16G 13/04 |
| 2002/0142874 A1 * | 10/2002 | Markley | ............... | F16H 55/30 474/212 |
| 2002/0155911 A1 * | 10/2002 | Hummel | ............... | F16G 13/04 474/212 |
| 2003/0017896 A1 * | 1/2003 | Markley | ............... | F16H 55/30 474/213 |
| 2006/0058137 A1 * | 3/2006 | Matsuura | ............... | B28D 1/045 474/139 |
| 2011/0103954 A1 * | 5/2011 | Vergnano | ............... | F03D 9/25 254/242 |
| 2011/0124451 A1 * | 5/2011 | Alexander | ............... | F02G 5/04 60/527 |
| 2011/0124452 A1 * | 5/2011 | Alexander | ............... | F03G 7/065 60/527 |
| 2020/0247503 A1 * | 8/2020 | Ribeiro | ............... | B62M 9/124 |

FOREIGN PATENT DOCUMENTS

| | | |
|---|---|---|
| CN | 110657986 A | 1/2020 |
| GB | 230839 | 3/1925 |
| PL | 209441 B1 | 9/2011 |
| PL | 231048 B1 | 1/2019 |
| WO | 95/04889 A1 | 2/1995 |

* cited by examiner

MECHANICAL SYSTEM WITH DOUBLE-SIDED CHAIN

The invention relates to a mechanical system with a double-sided chain, consisting of a driving wheel (S1), a tensioner wheel (S2), a driven wheel (S3) and a chain of a special design.

The book Dudziak M. Przekadnie cięgnowe, Wydawnictwo Naukowe PWN, Warszawa 1997, pp. 246-253 discloses a chain transmission consisting of at least two toothed wheels partially wound with a chain. The chain consists of a series of articulated links. For the chain to fit properly around the wheels, a small amount of sag is required, periodically or continuously adjustable thanks to the use of a tensioning roller. This roller allows the transmission to work properly as the chain elongates over time, mainly due to wear and tear of its parts. Roller ladder chains consisting of an alternating internal and external links composed of outer plates, pins, inner plates, bushings and rollers are commonly used in chain transmissions. A multiple ladder chain can be built by using appropriately elongated pins and by attaching to them external and internal plates in alternate pattern.

Another common type of chain is a pin gear chain composed of suitably shaped plates, each of which has on one of the long edges two projections constituting teeth corresponding in shape to toothed wheels forming—together with a chain—a chain transmission, while the other edge of the plate is smooth. The plates have two holes in which there are pins connecting adjacent chain links.

Patent description GB 230839 discloses a circular chain gear, in which the chain has links, each of which is equipped with two teeth on one side and a smooth surface on the other. The ends of each link are shaped to mate with the sides of the teeth of the interfacing toothed wheels.

U.S. Pat. No. 6,440,022 discloses a bilaterally toothed chain, having first and second links arranged in the longitudinal direction and in the transverse direction. Each first chain link consists of an odd number of transversely arranged link connectors, and each chain link consists of an even number of transversely arranged connectors and pins, each of which is adapted to mate with two opposite chain links. The connectors of the first chain link and the connectors of the second chain link have the same side profile so that two teeth are provided on one side and the other has a smooth surface. On each of the first and second chain links, the teeth of the extreme connectors face the outside of the chain and the teeth of the internal connectors face in the opposite direction.

Patent application US 2003/0017896 discloses a toothed wheel with a drive chain composed of links. The wheel has radially protruding teeth spaced apart by the length of the chain links. The chain has two tiers of alternating pin-connected driving and leading links. Both tiers of links are interlaced along the chain so that the rows of links in the second tier are placed between the links of the adjacent rows of the first tier, and the rows of links in the first tier are placed between the links of the adjacent rows of the second tier.

Patent description WO95/04889 discloses a self-tensioning drive chain, in which the length of the moving chain and its tension are constant despite the changing distance between the driving and driven wheels. This tension is obtained by appropriate positioning of the eccentric freewheel.

The eccentric freewheel forms the axis for two arms arranged in V-formation, supporting the chain drive and linearly separating the driving and driven wheels mounted at the ends of these arms, thus allowing their proper spacing. The eccentric freewheel is wound with a chain at least in the part of the toothed freewheel, both from the side of the driving and driven wheel.

Patent description PL 209 441 discloses a chain transmission with two toothed wheels, a toothed chain and a tensioner wheel, in which the centre of the reference circle of the driven wheel lies outside the circle inscribed in the part of the chain interfacing with this wheel. According to the invention, this transmission allows obtaining the same rotational speed of toothed wheels of different diameters when transmitting the drive via one chain.

Patent description PL 231048 B1 discloses a chain transmission with a similar method of operation. It is a transmission consisting of a driven wheel with internal toothing, as well as a driving wheel and a tensioner wheel with external toothing, which are placed inside the driven wheel and wound with a drive cable having teeth formed on its external side.

In the described solutions, it is not possible to obtain a higher value of torque on the axis of the driven wheel while maintaining the same rotational speed of the driven and driving wheels.

The invention relates to a mechanical system equipped with a double-sided chain, composed of a driving wheel (S1), a tensioner wheel (S2) of the chain (1), a driven wheel (S3) and a chain (1) which is wound around the wheels (S1) and (S2) and mates with the wheel (S3) on its outer side, characterized in that the wheel centres (S1), (S2) and (S3) are not collinear, while the position of the wheel axis (S2) in relation to the wheel axis (S1) and (S3) marks the line of operation of the chain (1) and determines the optimal angle alpha between the direction of the force vector F and the line perpendicular to the straight line joining the centres of the tensioner wheel (S2) and the driven wheel (S3), while the value of the angle alpha is equal 15 degrees and the value of the angle determined by the line of operation of the chain and the line joining the centres of tensioner wheel (S2) and driven wheel (S3) cannot be greater than 105 degrees.

The mechanical system is preferably characterized in that the value of the angle is equal to the value of the angle beta defined by the straight line perpendicular to the straight line joining the centres of the tensioner wheel (S2) and the driven wheel (S3) and passing through the starting point of interface (B) and passing through point (A) being the geometric centre of an arc with radius (R1) of the plate of the chain (1), point (B) where force F1 is applied, and point (C) being the geometric centre of an arc with radius (R2) defining the tooth contour of wheel (S3).

The mechanical system is preferably characterized in that the links of the chain (1) transmitting the force (F) equal to force (F1) to the wheel (S3) are articulated with each other by means of pins and are made of plates having teeth on the inside of the chain, mating with wheels (S1) and (S2) as well as on the outer side of the chain, mating with the wheel (S3), while on the (S1) and (S2) wheel side, the plate has two teeth shaped similarly to a triangle, while on the (S3) wheel side, the plate has on both sides the shape of a circle segment with radius (R1).

In the known solutions, it is not possible to obtain a higher value of torque on the axis of the driven wheel while maintaining the same rotational speed of the driven and driving wheels.

Such an effect is made possible by the mechanical system with a double-sided chain, to which this invention relates, consisting of a driving wheel (S1), a tensioner wheel (S2), a driven wheel (S3) and a chain of a special design, whose structure is shown in FIG. 1, while the construction details and their particular geometrical relationships are shown in FIG. 2.

Wheels (S1) and (S3) have the same number of teeth but differ in pitch diameters.

The pitch diameter (Fi 3) of the driven wheel is greater than the pitch diameter (Fi 1) of the driving wheel. The chain on its inner side winds around wheel (S1) and wheel (S2) and interfaces with them as in a chain transmission and interfaces with wheel (S3) as in a gear transmission.

The chain consists of links articulated with pins. The links consist of plates placed parallel to each other, having teeth both on the side of the chain interfacing with wheels (S1) and (S2) and on the side interfacing with wheel (S3), whereas on the side of wheels (S1) and (S2) the plate has two teeth shaped similarly to a triangle, while on the side of the wheel (S3), the plate has on both sides the shape of a circle segment with radius (R1).

The necessary conditions for obtaining the effect in the form of an increased value of torque on the wheel axis (S) include:
proper pitch diameter of wheel (S2) to allow adjusting the outer pitch of the chain to the pitch of wheel (S3) in the place where the chain interfaces with wheel (S3),
correct position of wheel (S2) in relation to wheels (S1) and (S3). After many years of research, during which hundreds of simulations and measurements were carried out, it was established that the centres of wheels (S1), (S2) and (S3) cannot be aligned, and the position of wheel (S2) in relation to wheels (S1) and (S3) determines the line of the chain operation and determines the correct angle alpha at which the chain interfaces with wheel (S3).

The value of the alpha angle is a key parameter affecting the correct operation of the mechanical system to which this application relates and is closely connected with the radius of arc (R1) which forms the contour of the chain plate.

The relationship between these parameters has a decisive impact on the value of torque obtained on the wheel axis (S3). The greater the angle alpha, the smaller the radius (R1) must be, but both of these values are chosen so that:
point (D), where force F is applied, and point (B), where force F1 is applied, are below the line joining the centres of wheels (S2) and (S3)
contact between the chain with wheel (S3) occurs only below the line joining the centres of wheels (S2) and (S3)

Hence, it follows that the angle alpha is equal in value to the angle beta.

The angle beta is defined by a line perpendicular to the line joining the centres of wheels (S2) and (S3) and passing through point (B) and a line passing through point (A) being the centre of arc (R1) of the chain plate, point (B) where force (F1) is applied and point C which is the centre of the arc of the tooth on wheel (S3) with radius (R2).

Force (F1) is the force acting on the tooth of wheel (S3) at the point of its application and is equal to force F while the force vector (F1) coincides with the line ABC.

Force F is the force acting on the pitch diameter of wheel (S1) and its vector has a direction and sense consistent with the direction of the chain's operation along its entire length.

The angles alpha and beta, as well as radii (R1) and (R2) are determined so that point (D) where force F is applied and point B where force F1 is applied are below the line joining the centres of wheels (S2) and (S3), i.e. on the side where the chain (1) and wheel (S3) disengage, and contact between the chain (1) and wheel (S3) occurs only below the line joining the centres of wheels (S2-S3).

As a result of determining the correct pitch diameter of wheel (S2) and its position in relation to wheels (S1) and (S3) and the appropriate shaping of the chain plate contour with radius (R1) and the tooth contour of wheel (S3) with radius R2, the angle at which force (F1) is transmitted to the wheel axis (S3) is 90 degrees.

Thanks to this design, it is possible to obtain an increased value of torque on the wheel axis (S3) and the rotational speed of wheel (S1) is identical to the rotational speed of wheel (S3) which is a direct result of the equal number of teeth on wheels (S1) and (S3).

In order to improve the efficiency of torque transmission to the axis of wheel (S3), it is possible to make a set of two or more systems consisting of a driving wheel (S1), a tensioner wheel (S2), a driven wheel (S3) and a chain of a special design, placed in parallel on the same axes but out of phase with each other by the appropriate angle, the same for wheel axis (S1) and wheel axis (S3), so that their work cycles are mutually complementary. An embodiment of such an assembly is shown in FIG. 4. On the wheel axis (S1), a second, identical wheel is mounted but out of phase by a predetermined angle.

The same for wheel axles (S3). Staggering both systems relative to each other by a predetermined angle allows significantly improving the smooth operation of the mechanical system, eliminating possible losses related to the system's inaccurate engineering.

An embodiment is shown in FIG. 1 to FIG. 5 where:

Figure 1:
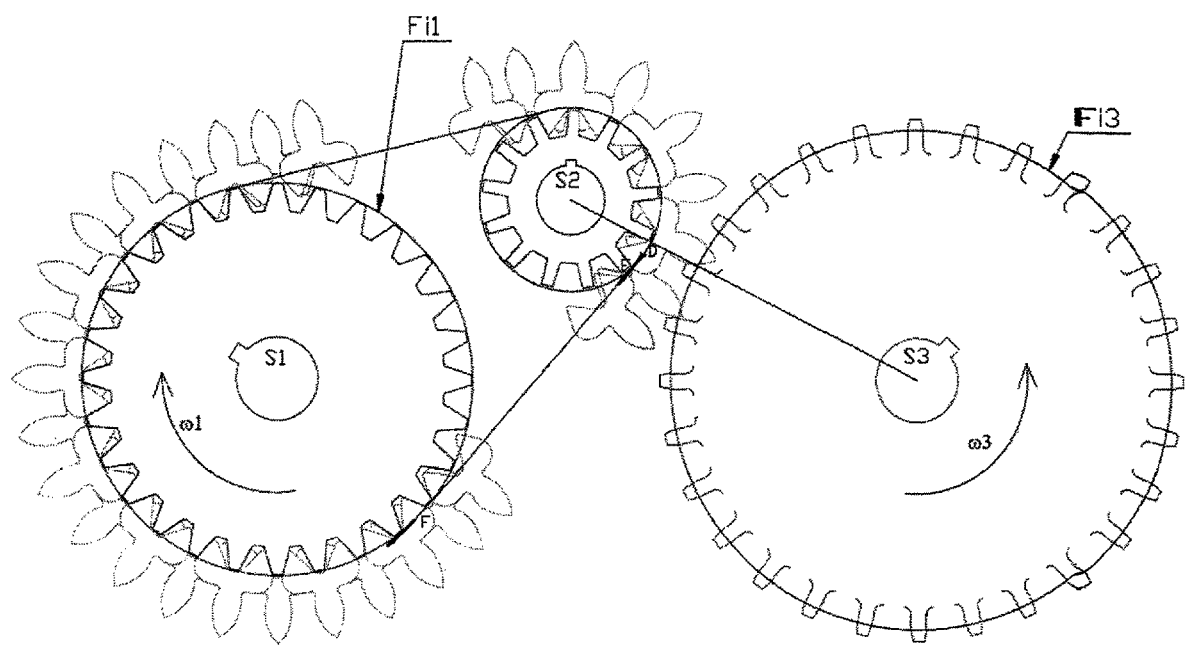
FIG. 1 shows an overview of the mechanical system.
Figure 2:
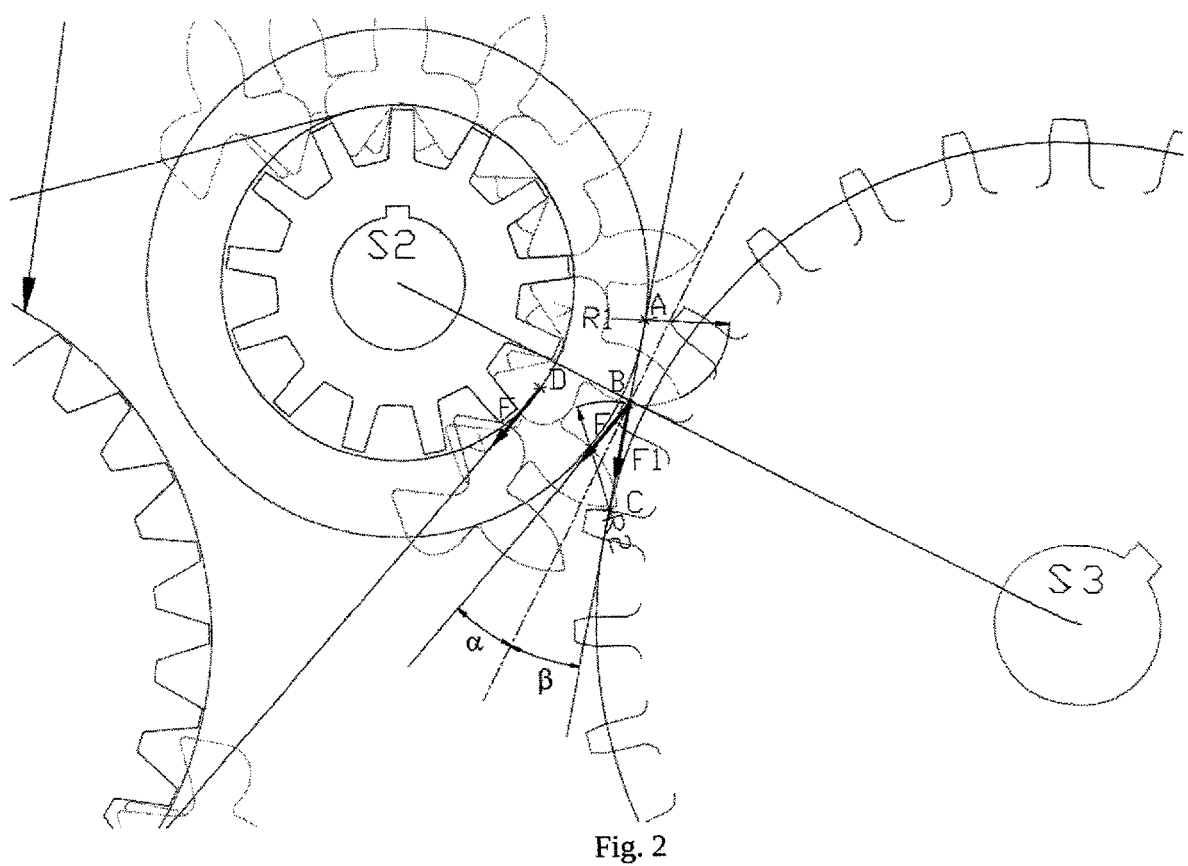
FIG. 2 shows a fragment of the system in which the interfacing occurs between the chain (1) wound around tensioner wheel (S2) and the driven wheel (S3). The figure shows geometrical relations between the outer contour of the chain plate and the shape of the teeth of wheel (S3) as well as other relations described in the patent application.
Figure 3:
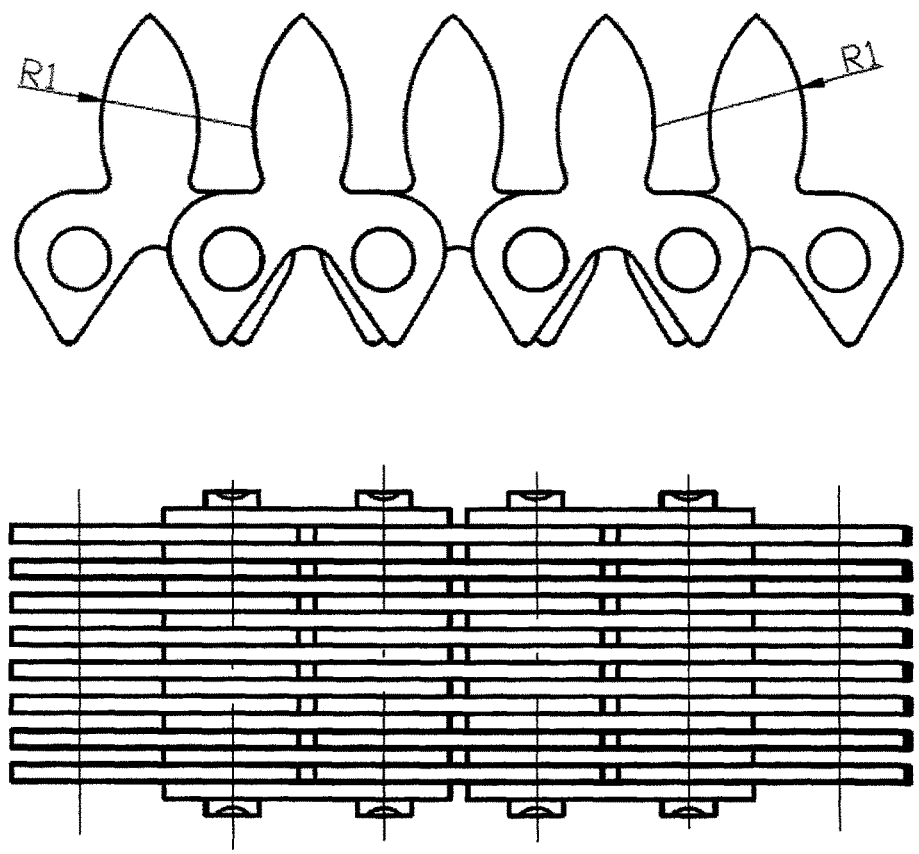
FIG. 3 shows the front and top view of a multiple chain composed of plates with a special contour
Figure 4:
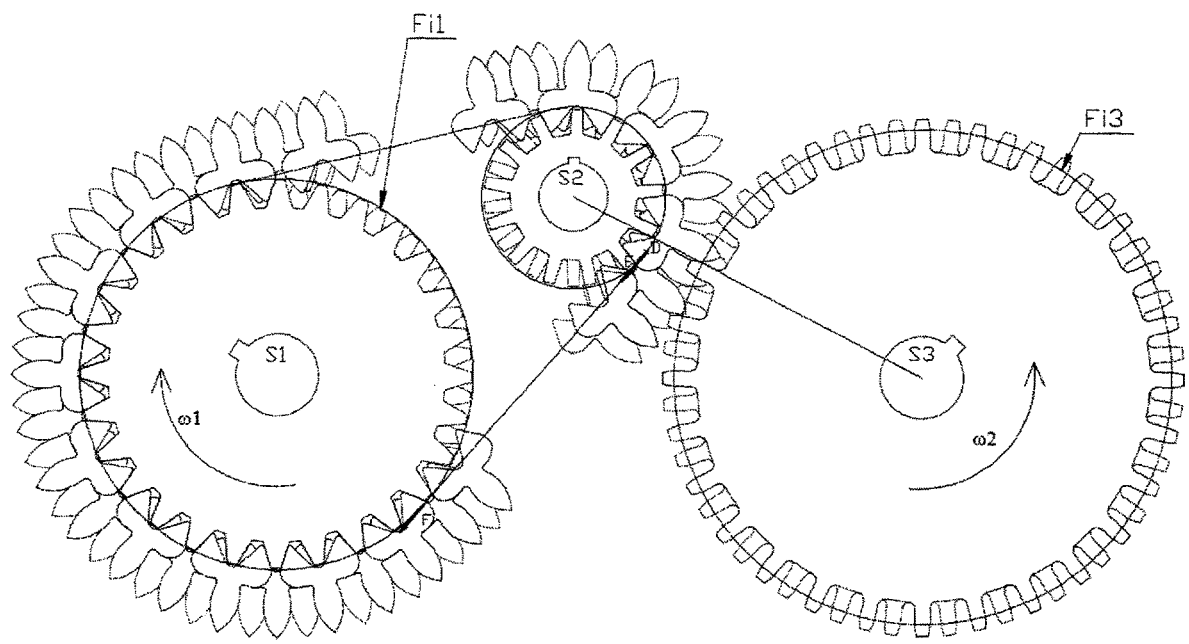
FIG. 4 shows an embodiment of an assembly of two mechanical systems in which all the elements, i.e. the wheels (S1, S2, S3) and the chains (1), have been multiplied (used twice here) and their positions have been staggered relative to each other by a certain angle.
Figure 5:
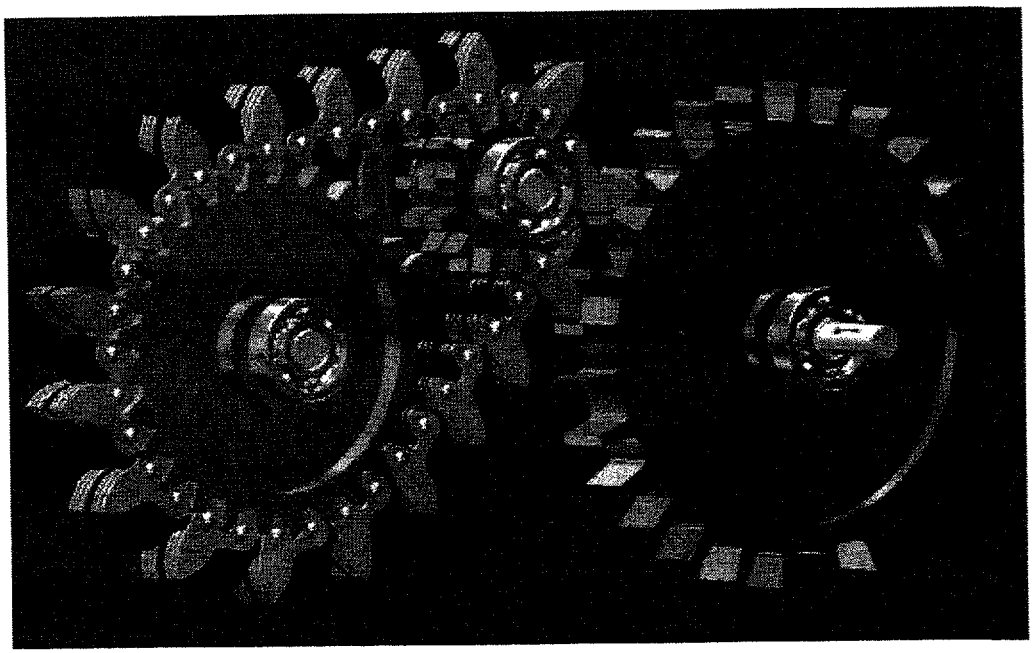
FIG. 5 is an isometric view of an embodiment of the mechanical system according to the invention.

The invention claimed is:

1. A mechanical system with a double-sided chain, comprising a driving wheel (51), a tensioner wheel (52) and a driven wheel (53), in which the chain winds around the wheels (51) and (52) and engages with the wheel (53) on its outer side, characterized in that the axes of rotation of the wheels (51), (52) and (53) are not in the in one line, the diameter of the driving wheel (51) is smaller than the diameter of the driven wheel (53), but both of these wheels have the same number of teeth, the diameter of the wheel (52) is selected so that the distances between the outer teeth of the chain 1 and the teeth of the wheel (53) at the contact point B are the same, and the chain 1 has teeth on both sides, the teeth on the inside of the chain being triangular and the teeth on the outside on both sides they have the shape of a sector of a circle with a radius R1 with the center located at point A, which lies on the same line with point B, which is the point of contact of the chain tooth with the tooth of the wheel (53), and point C, which is the center of the arc with the radius R2, which traces the outline of the tooth of the wheel (53), where the radii R1 and R2 are selected in such a way that point B is always below the line connecting the centers of circles (52) and (53), and the angle determined by the line passing through points ABC coincides with the line of the force vector F1 and the line passing through point B parallel to of the chain work line coincident with the line of the force vector F had a value of 30°, and the angle determined by the chain work line coinciding with the force vector F and the line connecting the centers of the wheels (52) and (53) was not greater then 105°.

* * * * *